United States Patent [19]

Kipp

[11] 4,425,974

[45] Jan. 17, 1984

[54] METHOD FOR COUNTING SIGNATURES EMPLOYING A WEIGHING TECHNIQUE

[75] Inventor: Louis D. Kipp, Miramar, Fla.

[73] Assignee: EDS-IDAB, Inc., Hialeah Gardens, Fla.

[21] Appl. No.: 370,346

[22] Filed: Apr. 21, 1982

[51] Int. Cl.³ .............................................. G01G 19/42
[52] U.S. Cl. ......................................... 177/1; 177/25; 177/50; 364/567; 414/21
[58] Field of Search ....................... 177/25, 50, 1, 200; 364/567; 414/50, 21

[56] References Cited

U.S. PATENT DOCUMENTS 4,043,412  8/1977  Rock ...................................... 177/25
4,157,738  6/1979  Nishiguchi ............................. 177/1

*Primary Examiner*—Joseph W. Hartary
*Attorney, Agent, or Firm*—Weinstein & Sutton

[57] ABSTRACT

A stack of signatures is delivered to a weighing platform which measures bundle weight. A stored bundle weight is subtracted from the measured bundle weight to yield a difference which is compared against the stored reference weight of an individual signature. If the difference is a multiple of the weight of an individual signature, an indication of a count error is given. If the aforesaid difference is greater than the weight of an individual signature but is not an integral multiple of that weight, an indication of a possible combination error is given. If the difference is less than the weight of an individual signature, a recalibration is initiated to substitute the reference weight per unit with a new value prior to initiation of the next measuring cycle. In the presence of a combination error pattern, a manual count check is made on the subsequent sample to insure a correct count and a recalibration is then initiated.

23 Claims, 7 Drawing Figures

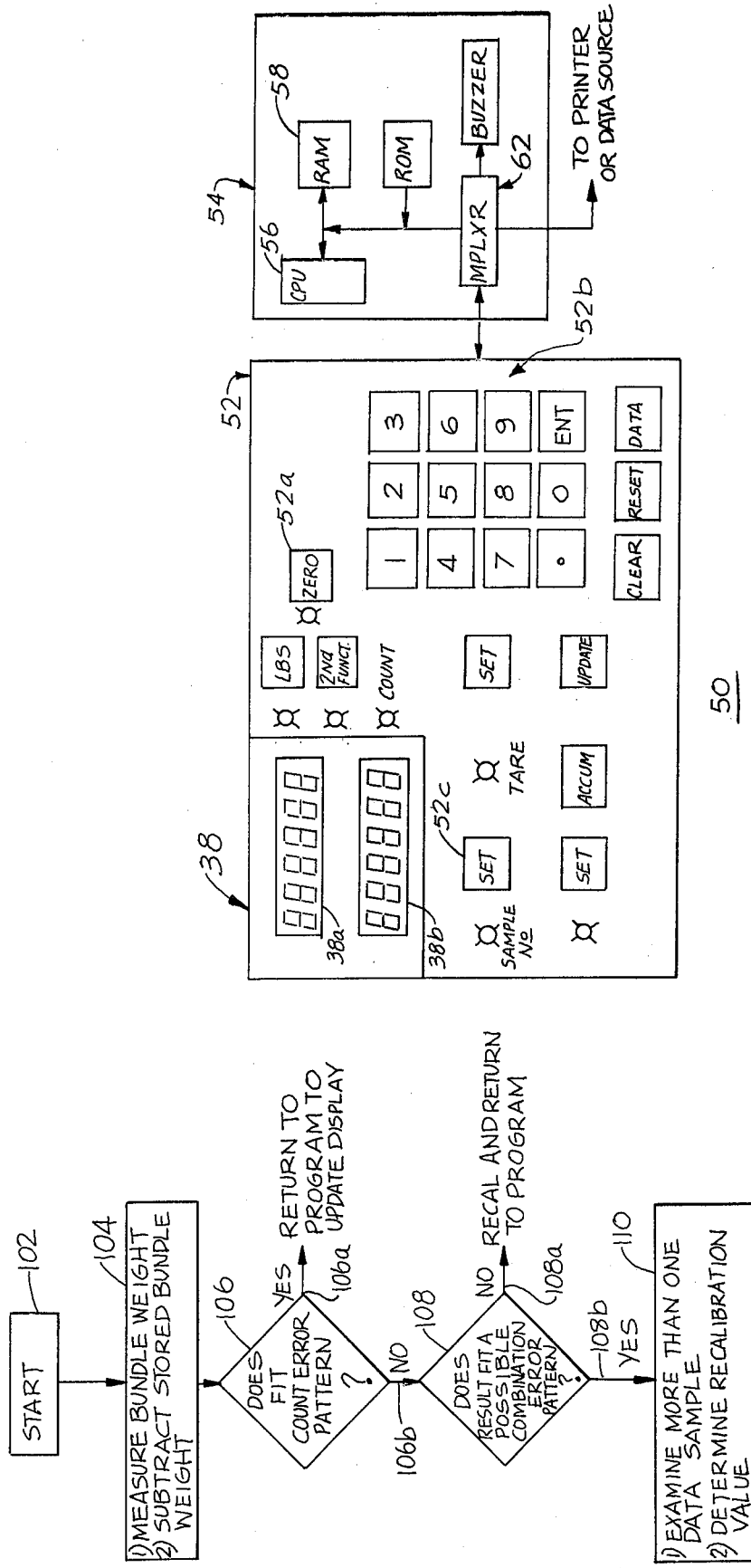

METHOD FOR COUNTING SIGNATURES EMPLOYING A WEIGHING TECHNIQUE

FIELD OF THE INVENTION

The present invention relates to signature counting and more particularly to method and apparatus for confirming the count of a stack of signatures by employing a weighing technique in which the difference between a weighed bundle and a stored sample bundle value are compared to determine the accuracy of the count and the possible need for recalibration of the stored sample.

BACKGROUND OF THE INVENTION

Signatures, such as for example newspapers, are delivered from the press room to an area typically referred to as the mail room where the signatures are counted, stacked and strapped preparatory to delivery to customers, such as news stores, newsboys and the like. The signatures are delivered to the mailroom at speeds of up to eighty thousand signatues per hour. Signature stacking and counting equipment is employed to separate and stack the signature stream into neat bundles and to count the signatures during the stacking operation. A completed bundle of the proper count is ejected from the stacker before the next bundle being formed is deposited upon the stacker platform. Although present day counting apparatus perform a reasonably accurate counting function, errors nevertheless are found to occur in such apparatus and it is desireable to insure the accuracy of a count without any reduction in the signature delivery rate.

BRIEF DESCRIPTION OF THE INVENTION

In order to assure the accuracy of a count, it has been proposed that the count of a bundle be confirmed through the employment of a weighing technique. Through the use of this technique, a counted bundle is delivered to a weighing platform where its weight is measured. The measured weight is compared against the stored weight of a bundle having the same count to determine what, if any, difference exists therebetween. If the difference is zero or some minute fraction of the weight of a single signature, the accuracy of the count established by the stacker is clearly confirmed.

Even assuming the count to be accurate, the difference between the measured and stored bundle weights may nevertheless be found to vary by a significant amount. Such differences (positive or negative) may be caused by changes in the base weight of the paper. Changes may occur over the length of one paper roll or between different paper rolls. The weight change may also result from the amount of ink transferred to each succeeding signature during the printing operation, although this difference is usually less significant than the change in base weight of the paper. Although the deviation from a sample value may be rather small, it should be understood that this deviation is cumulative and, in fact, can be quite significant when forming bundles which contain signatures in the range of from fifty to one hundred or more, for example.

As a result, the weighing technique employed for confirming the accuracy of a bundle count examines the difference between the measured and stored bundle weights for the purpose of indicating either an error in the count or confirming the accuracy of the count and for performing a recalibration of the stored bundle weight, which takes into account changes in paper base weight and the like.

The method and apparatus of the present invention comprises the steps of subtracting a stored bundle weight from the measured bundle weight or a bundle of a predetermined count and comparing the difference with the stored unit weight of a single signature.

If the difference is less than the stored unit weight the cause of the weight change is not attributed to a count error and the accuracy of the count is thereby confirmed. However, the stored unit weight and stored bundle weight are recalibrated to take into acount the detected weight change.

In the event that the weight difference is greater in magnitude than the stored unit weight but not an exact multiple of the stored unit weight, a bundle of known count will be measured and a recalibration made. The weighing technique provides a simple and accurate way of confirming bundle counts and with the minimum of interference in bundle handling rate. Thus, weight changes are updated after each bundle is weighed.

OBJECTS OF THE INVENTION AND BRIEF DESCRIPTION OF THE FIGURES

It is therefore one object of the present invention to provide a method and apparatus for confirming the accuracy of bundle counts through the employment of a weighing technique.

Another object of the present invention is to provide a novel weighing technique for use in counting signature bundles wherein the weight of the bundle is utilized to confirm the accuracy of a bundle count and further incorporates a technique for recalibrating the sample weights to compensate for weight changes in the base weight of the signatures to insure the accuracy of the counting operation.

The above as well as other objects of the present invention will become apparent when reading the accompanying description and drawing in which:

FIG. 2 shows a simplified flow diagram of the counting technique employed in the present invention.

FIG. 3 shows a simplified block diagram of the electronic control apparatus employed for controlling the weighing operation.

DETAILED DESCRIPTION OF THE INVENTION AND THE PREFERRED EMBODIMENTS THEREOF

Figure 1:
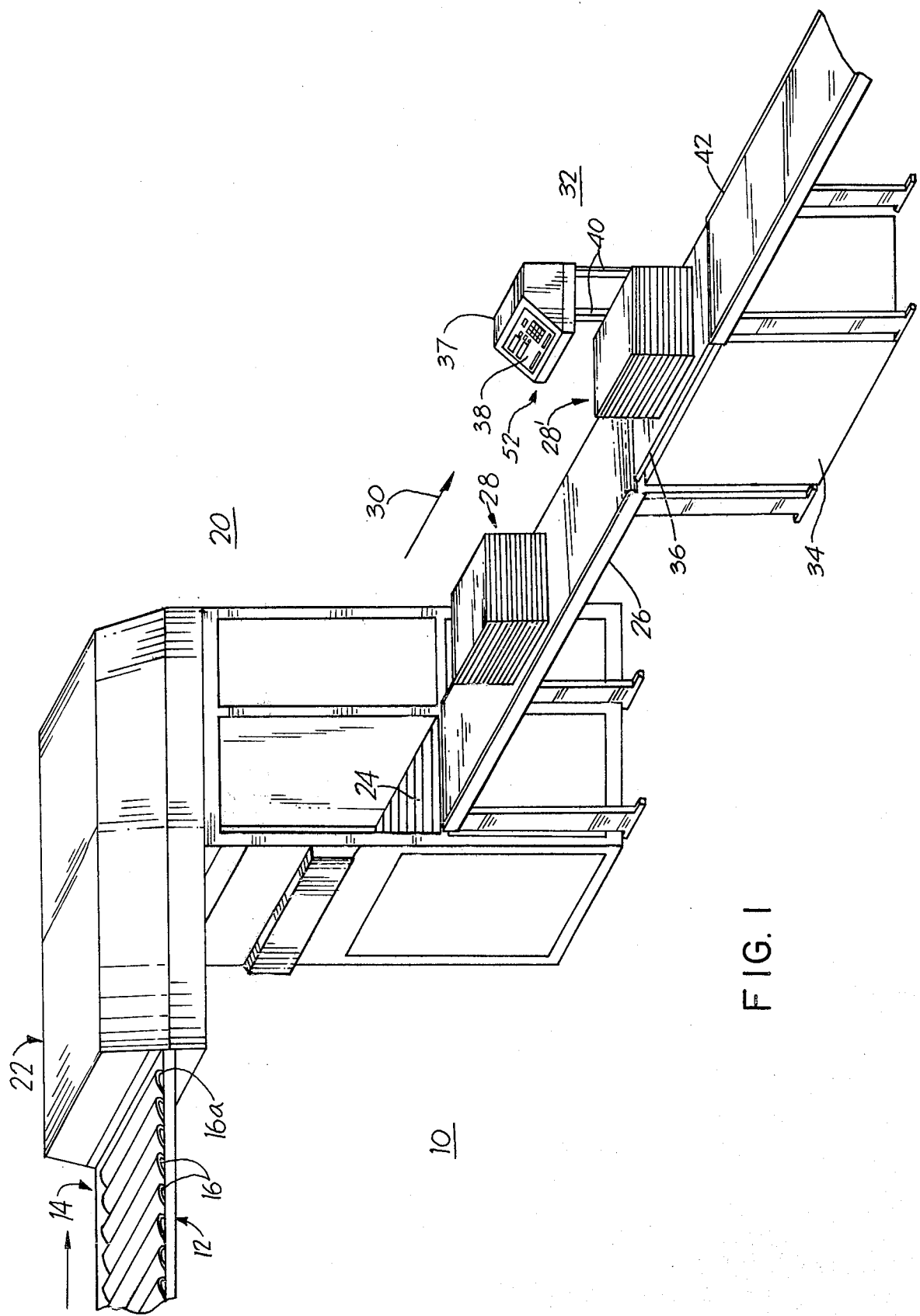
FIG. 1 is a perspective view showing a signature stacking and counting system embodying the principles of the present invention.

FIG. 1 shows a signature stacking and counting system 10, incorporating a high speed conveyor 12 for conveying a signature stream 14 of individual signatures 16, arranged in conventional overlapping fashion, to the infeed portion 22 of signature stacking and counting apparatus 20. The signature stacking and counting apparatus 20 may be any conventional apparatus adapted to count signatures by means of a sensor which typically engages the spine 16a or folded front edge of each signature, said spine or folded edge being the leading edge of the signature, i.e. the spine 16a of the signature is first to enter the conveyor section 22.

A sensor means (not shown for purposes of simpicity) is engaged by the spine 16a of each signature 16 to effect a count. When the desired count is reached, a stacker blade or other separater abruptly enters into the signature stream to prevent subsequent signatures from being included in the completed bundle. The completed bundle of the desired count is then ejected from the stacker platform 24 onto outfeed conveyor 26 which conveys completed bundles, such as for example bundle 28, in the direction shown by arrow 30 toward weighing apparatus 32.

Weighing apparatus 32 is comprisd of a housing 34 resiliently supporting weighing platform 36. A second housing 37, having display panel 38, is positioned above weighing platform 36 by supports 40 which are secured along the rear side of housing 34. A keyboard 52 may be arranged at the right end of panel 38.

A bundle, such as for example bundle 28', is delivered to weighing platform 36 for the weighing and count confirmation operation. Upon completion thereof, the bundle 28' is delivered to conveyor 42 which in turn delivers completed bundles to strapping apparatus (not shown for purposes of simplicity) which serves to strap or tie a completed bundle.

The stacking apparatus 20 including the sensor, stacker blade and the like may be any conventional apparatus, such as for example that disclosed in U.S. Pat. No. 4,037,525 issued July 26, 1977 and assigned to the assignee of the present invention.

Although the apparatus described in the above patent may be used advantageously with the present invention, any other comparable signature stacking and counting apparatus may be employed, if desired.

In order to confirm the accuracy of counted bundles, it is first necessary to initialize the weighing system. Making reference to FIG. 3, this is done in one of two ways. In both ways, the tare weight is compensated for by depressing the zero key 52a, thus zeroing the scale. Thereafter, one of the following steps is taken, depending on preference. A sample bundle of a known, correct count is placed on the weighing platform 36 and the count is entered using sample number set switch 52c and numeric keys 52b. In this mode the count will be displayed at 38b and the calculated unit weight will be displayed at 38a. A second method which may be used consists of measuring and entering the unit weight of a single signature by placing the signature upon platform 36. In both cases, the single signature weight is stored in an appropriate address location in Random Access Memory (RAM) 58 forming part of control computer 54.

Having performed the system initialization, the counting operation employing the weighing technique is ready for use. When the next bundle is delivered to platform 36, its weight is measured and displayed at display portion 38b. The stored bundle weight is subtracted from the measured bundle weight. This difference is compared against the stored unit (i.e., single signature) weight. In the event that the difference is less than the stored unit weight, the bundle count is confirmed and the stored bundle weight and stored unit weight are recalculated.

If the difference proves to be an integral multiple of the stored unit weight, this is indicative of a count error, causing a series of "E"s to be displayed at 38a. If desired, this indication may be accompanied by a warning buzzer. The difference count will be displayed at 38b.

If the difference is greater than the stored unit weight, but not an integral multiple thereof, this condition is interpreted as a combination error pattern, i.e. a combination of the two aforementioned conditions, including a weight change and a counting error, causing a series of "E"s to be displayed at both 38a and 38b. Also, a pulsed sounding of the warning buzzer is generated.

FIG. 2 shows a simplified block diagram of the program steps for performing the weighing and counting operation. Upon initiation of the program at step 102, at which time the computer is initialized, the program advances to step 104 at which time the bundle weight is measured and the stored bundle weight is subtracted from the measured bundle weight. The difference is compared against the stored unit weight at 106, which determines if the difference meets the count error pattern. This is preferably determined by dividing the difference by the stored unit weight. If the quotient is an integral multiple of the stored unit weight, the program branches at 106a to update display 38 illuminating EEEEEE at 38a and further displaying the count difference obtained through the weighing operation display portion 38b.

If the quotient obtained in step 106 is not an integral multiple of the stored unit value, the program branches at 106b to determine if the difference fits a possible combination error pattern at step 108. This is preferably determined by examining the quotient obtained at step 106. If the quotient is greater than 1, this indicates a combination error pattern, i.e. a counting error and a change in the signature weight from that previously stored. In the presence of this condition, the program branches at 108b, updating the display to show this condition and the need to initiate a recalibration operation, as will be more fully described.

In the event that the examined quotient is less that 1, this indicates that only a weight change has occurred. See Branch 108a. The accuracy of the count is confirmed by the display wherein the actual count will be displayed at 38b. A recalibration operation is initiated. This is preferably accomplished by dividing the difference by the confirmed bundle count to establish a new unit weight which is then stored and which replaces the previously stored unit weight.

If the aforesaid difference is 1 or greater and is an integral multiple of the stored unit weight, this indicates a counting error. The counting error, which consists of a series of the letter "E" (EEEEEE), is displayed and illuminated at 38a. The integral multiple resulting from the division of the aforesaid difference by the stored unit weight will be displayed as a plus or minus count at display 38b.

In the event that the division of the aforesaid difference by the base unit weight is greater than 1, but is not an integral multiple thereof, this indicates a combination error pattern, i.e. both a weight change and a counting error. The combination error pattern is displayed in both 38a and 38b. Since it is not possible without further analysis to ascertain the basis for the composite error pattern, the calculation of the count resulting from the weighing operation is not performed.

The presence of a composite error pattern can lead to a number of responses. The system may be configured to require manual intervention after the first occurrence, such that the subsequent bundle is checked for count accuracy and, when weighed, a recalibration initiated. Another option is to allow a second weighing and to compare the next result before manual intervention.

In the example given where the difference is smaller in magnitude than the stored base unit weight, the weight of the bundle is divided by the confirmed bundle count to develop an updated base unit weight which replaces the previously stored base unit weight.

Figure 4A:
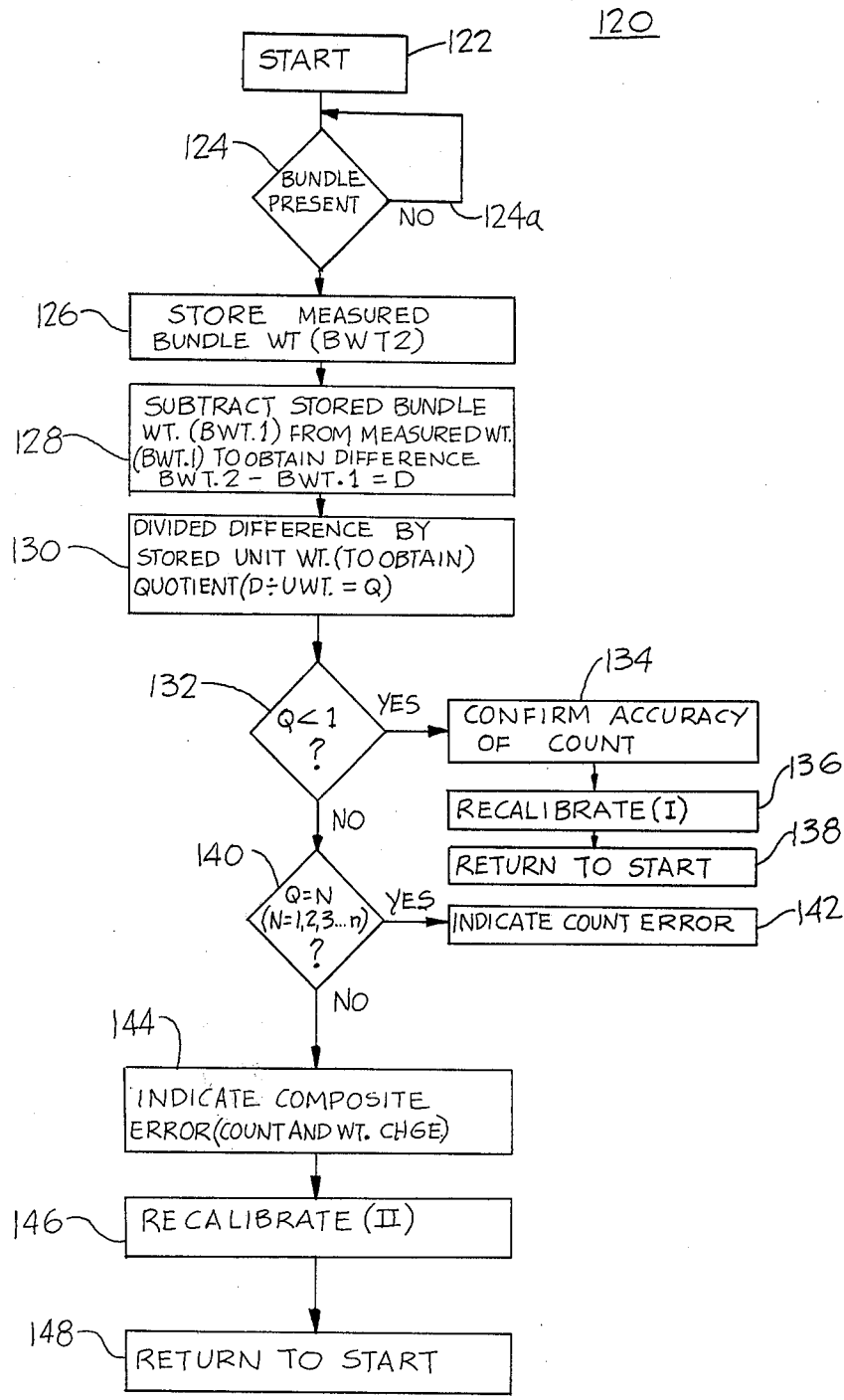
FIGS. 4a through 4d show more detailed flow diagrams of the weighing technique depicted in FIG. 2.

FIG. 4a shows a flow diagram 120 showing the weighing operation program steps in greater detail, wherein at step 122, when the weighing program is started, the program advances to step 124 to look for the presence of a bundle and continues to loop at this position until a bundle is present. As soon as a bundle is present, it is weighed and its measured weight is stored at 126. The initially stored bundle weight is subtracted from the just measured bundle weight at 128 to obtain a difference D. At step 130, the difference D is divided by the unit weight to obtain a quotient Q. The resulting quotient Q is examined at 132. In the event that the quotient Q is less than 1, the accuracy of the stacker count is confirmed by displaying the actual count at display portion 38b. Thus, at step 134, the stored count is displayed and at step 136 the first type of recalibration operation is performed, as will be described more fully hereinbelow whereupon the program jumps from step 138 to the start positon 122, performing the next weighing operation.

In the event that the quotient Q is 1 or greater, the program advances to step 140 and the quotient Q is examined. If the quotient is an integral multiple of the base unit weight, i.e. the quotient equals N, where N equals 1, 2, ... n, where n is a real integer, this indicates a counting error, causing the program to branch to step 142 which develops a counting error indication on 38b of the display 38. In the event that the quotient is other than an integral multiple of the base unit weight, and is greater than 1 as is established at program step 132, the program branches to step 144 to provide a composite error pattern on display 38. The program then initiates a second form of recalibration at step 146 whereupon the program returns to the start position at 122 upon completion of the second form of recalibration.

Figure 4B:
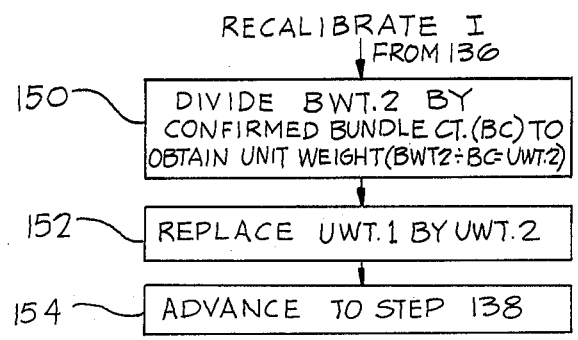

The first form of recalibration indicated at step 136 is shown in greater detail in FIG. 4b, wherein the bundle weight is divided by the confirmed bundle count to obtain a new unit weight, at step 150. The new unit weight replaces the previously stored unit weight, at step 152. The program then advances to step 154 which returns to step 138, causing the program to return to the start in readiness for another weighing operation.

Figure 4C:
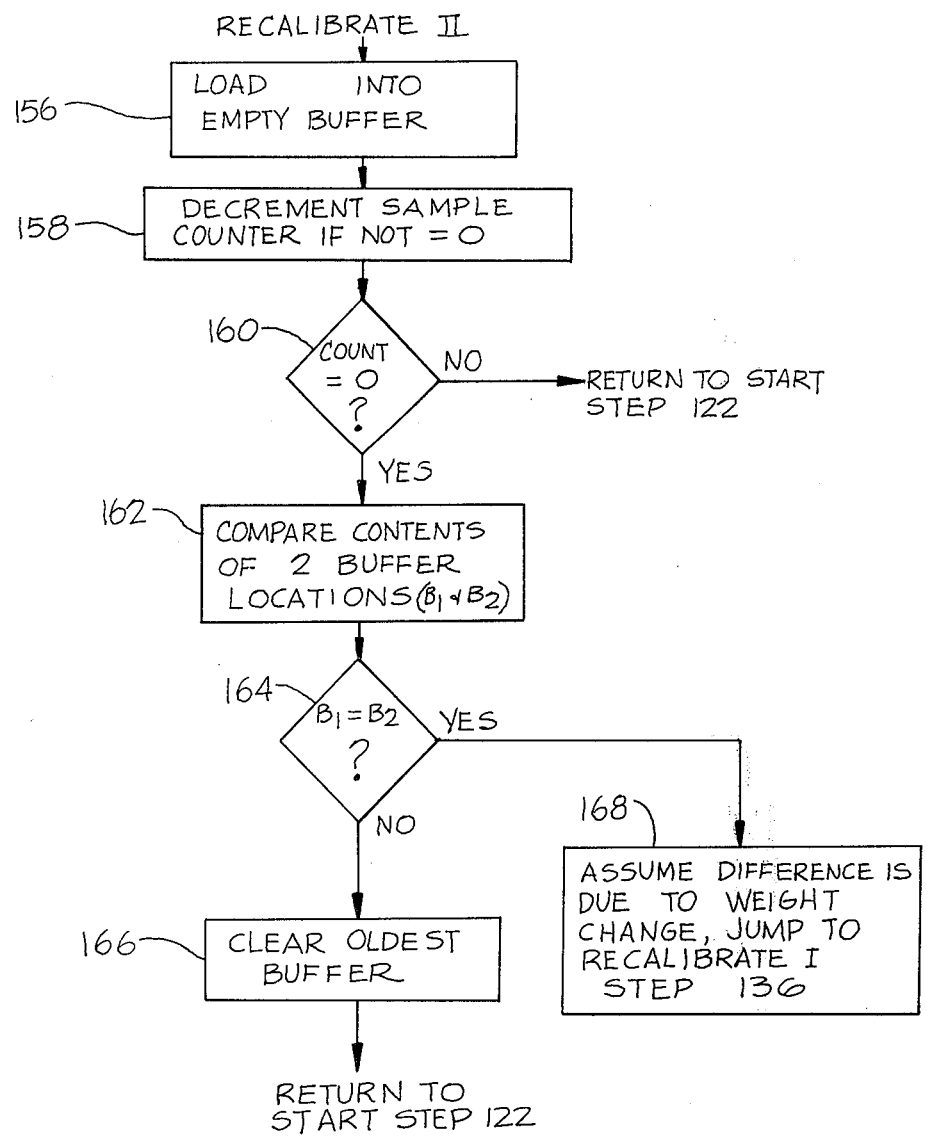

The program steps for the second form of recalibration is shown in FIG. 4c wherein, from step 146 the program advances to step 156. At this time, the quotient calculated in step 130 is stored in a buffer. The next step, 158, consists of decrementing a sample counter that was preset to a count of 2. The purpose of this counter is to insure that no recalibration of any kind can take place on a first composite error pattern. On the next measuring cycle the program may exit at step 132 or 140, and, if so, will reinitialize the sample counter 158; however, if the next measuring cycle again yields a composite error pattern, the program will branch at step 160. The contents of buffers 1 and 2, which will contain the two consecutive error pattern quotients, will be compared at step 162. If equal, the program will branch at step 164, on the assumption that the suspected composite error pattern was in reality a weight error, and will perform a recalibration I at step 136.

If the two quotients are not equal, the program will advance to step 166 where the oldest quotient containing buffer will be cleared. Thereafter, the program will return to start at step 122.

Figure 4D:
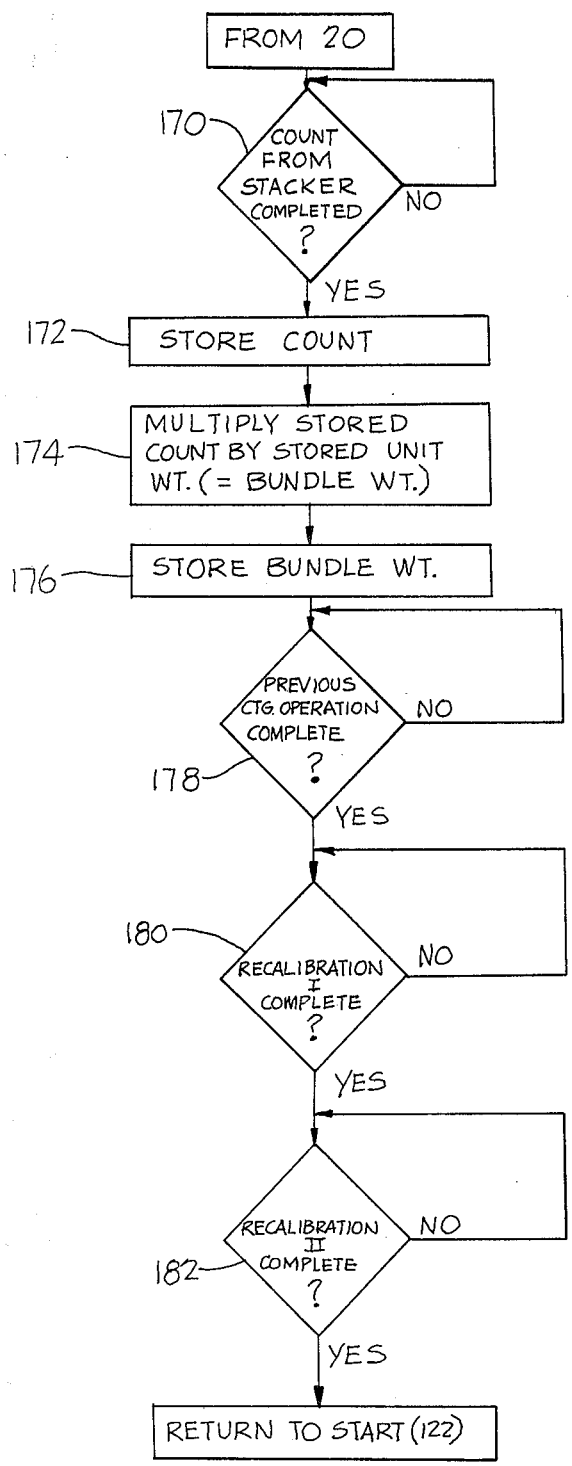

In another preferred form of the present invention, a weighing operation may be initiated by the stacker. For example, the stacker may be preprogrammed to count and stack bundles in any sequence and of any size wherein succeeding bundles may be of the same count or of different counts and the bundles may be arranged in any order in accordance with the program under which stacker 20 is operated. As soon as each count developed, it is made available at an output of stacker 20, which output is coupled to the control computer 50 (see FIG. 3) through multiplexer 62. More specifically, and considering the flow diagram of FIG. 4d, the computer coninues to loop at step 170 until a count is received from stacker 20. As soon as a count is received, it is stored at step 172. Thereafter the count is multiplied by the stored unit weight to develop a bundle weight at step 174 and this value is stored at step 176. Steps 178, 180 and 182 are repetitive looping steps which respectively continue to loop until the previous counting operation is complete and/or the first type of recalibration is complete and/or the second type of recalibration is complete, whereupon the program then returns to the start of step 122 preparatory to a weighing operation. This arrangement provides greater versatility and operating speed by eliminating the need to manually key in each different bundle size and store its measured weight.

A latitude of modification, change and substitution is intended in the foregoing disclosure and, in some instances, some features of the invention will be employed without a corresponding use of other features. Accordingly, it is appropriate that the appended claims be construed broadly and in a manner consistent with the spirit and scope of the invention herein.

what is claimed is:

1. A method for confirming the count of a bundle of signatures comprising the steps of:
    weighing the bundle to obtain the bundle weight;
    comparing the measured weight against a predetermined standard to obtain a difference therebetween;
    comparing said difference with a predetermined unit weight; and
    confirming the accuracy of the original count if said difference is smaller than said predetermined unit weight.

2. The method of claim 1 further comprising the step of indicating a count error if the difference is equal to or greater in magnitude than said predetermined unit weight.

3. The method of claim 1 further comprising the step of dividing the measured bundle weight by the confirmed count to establish a unit weight which replaces the previously predetermined unit weight for use in confirming the count of subsequent bundles.

4. The method of claim 1 wherein said first comparing step further comprises the steps of dividing the difference by said unit weight to obtain a quotient and examining said quotient and indicating an error in said bundle count when said quotient is an integral multiple of said predetermined unit weight.

5. The method of claim 4 further comprising the steps of:
    examining said quotient and indicating the presence of an error in the bundle count and a change in unit weight when said quotient is greater than said predetermined unit weight and is not an integral multiple of said predetermined unit weight.

6. The method of claim 1 further comprising the steps of weighing a single signature and storing the measured weight; and multiplying the stored measured weight by the count of the bundle to obtain the predetermined bundle measured weight.

7. The method of claim 1 further comprising the steps of:

recalibrating the unit weight when the difference is greater than zero and storing the unit weight obtained and discarding the unit weight utilized previous thereto.

8. The method of claim 1 further comprising the steps of recalibrating the unit weight when the difference is greater than zero and storing the unit weight obtained and discarding the unit weight utilized previous thereto.

9. The method of claim 8 wherein the recalibration step is comprised of dividing the measured weight of the bundle by the confirmed count of the bundle to obtain a single signature weight.

10. A method for confirming the count of the signature bundle comprising the steps of:

counting the signatures delivered to a stacking and counting station and forming a bundle comprised of a stack of the counted signatures;

multiplying a stored single signature weight by the count of said bundle to obtain a bundle weight;

weighing the bundle whose count is to be confirmed;

subtracting the generated bundle weight from the measured bundle weight to obtain a difference;

comparing said difference with the predetermined single signature weight and confirming the count of said bundle so long as the difference is smaller in magnitude than said single bundle weight.

11. The method of claim 10 further comprised of the steps of indicating that the count of said bundle is incorrect if said difference is greater in magnitude than the stored single signature weight; and recalibrating the stored single signature weight using signatures from the bundle whose count has been established as being erroneous to recalibrate and thereby develop an updated single signature weight which replaces the single signature weight established previous thereto.

12. Apparatus for confirming the count of signature bundles performed by a counting and stacking means for producing a bundle of signatures from a signature stream developed in said stacking and counting means, comprising:

first means for weighing signatures;

second means responsive to said first means for storing the weight of a single signature;

third means for receiving the count of each bundle being weighed;

fourth means responsive to said count and the value in said second means for generating a bundle weight;

fifth means for subtracting the generated bundle weight from the measured bundle weight to generate a difference value;

sixth means for comparing said difference value against the value in said second means; and seventh means responsive to said sixth means for confirming the count of said bundle when said difference is less than the value stored in said storage means.

13. The apparatus of claim 12 further comprising eighth means responsive to said sixth means to generate an error signal when said difference is greater than the value in said storage means.

14. The apparatus of claim 12 further comprising eighth means responsive to said sixth means for recalibrating said single signature weight to generate an updated single signature weight which replaces the previously developed single signature weight in said second means.

15. The apparatus of claim 14 wherein said recalibration means comprises ninth means for dividing the measured weight of said bundle by the confirmed count of said bundle for generating an updated single signature value and inserting the updated single signature value into said second means to replace the single signature value previously stored in said second means.

16. The apparatus of claim 12 further comprising eighth means responsive to said sixth means for generating an error signal when said difference is greater in magnitude than the value within said second means.

17. The apparatus of claim 16 further comprising display means for displaying an error indication responsive to said error signal.

18. The apparatus of claim 16 further comprising ninth means responsive to said error signal for performing a recalibration of said single signature weight.

19. The apparatus of claim 18 wherein said ninth means is comprised of means for summing the weights of individual signatures placed on said weighing means; and tenth means for dividing said sum by the number of individual signatures weighed to develop an updated single signature weight and replacing the value in said storage means by said updated single signature weight.

20. A method for confirming the count of a bundle of signatures comprising the steps of:

separating a predetermined number of signatures from a substantially continuous stream of signatures and arranging said predetermined number of signatures into a neat stack;

weighing said stack;

subtracting the weight of said stack from a previously established stack weight for a stack of the predetermined count;

comparing the difference resulting from said subtraction with a previously established unit signature weight; and confirming the accuracy of the count if the magnitude of the difference is less than the magnitude of the previously established unit signature weight.

21. The method of claim 20 further comprising the steps of updating the unit signature weight by dividing the weight of said stack by the confirmed count to create an updated unit signature weight and replacing the previously established unit signature weight with the updated unit signature weight.

22. The method of claim 20 further comprising the steps of indentifying the count as inaccurate if the magnitude of the difference is greater than the magnitude of the previously established unit signature weight; and weighing the stack again and comparing the results of the first and second weighing operations and confirming a weight change if the two weights are not equal.

23. The method of claim 21 further comprising the steps of:

recounting the signatures in the stack;

dividing the weight of the stack by the last mentioned count to create an updated unit signature count; and replacing the previously established unit signature count by the updated unit signature count.

* * * * *